(12) United States Patent
Shaughnessy (10) Patent No.: US 8,117,174 B2
(45) Date of Patent: *Feb. 14, 2012

(54) DATABASE SYSTEM PROVIDING HIGH PERFORMANCE DATABASE VERSIONING

(75) Inventor: Steven T. Shaughnessy, Scotts Valley, CA (US)

(73) Assignee: Borland Software Corporation, Scotts Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/895,706

(22) Filed: Sep. 30, 2010

(65) Prior Publication Data

US 2011/0179000 A1 Jul. 21, 2011

Related U.S. Application Data

(63) Continuation of application No. 10/710,356, filed on Jul. 2, 2004, now Pat. No. 7,822,727.

(51) Int. Cl.
*G06F 7/00* (2006.01)

(52) U.S. Cl. ....................................................... 707/704
(58) Field of Classification Search ........................ None
See application file for complete search history.

(56) References Cited

U.S. PATENT DOCUMENTS 6,192,377 B1 * 2/2001 Ganesh et al. ........................ 1/1
6,631,374 B1 * 10/2003 Klein et al. .................... 707/638

OTHER PUBLICATIONS

Weems, "Shadow Cache," University of Massachusetts, May 2004.*
Natarajan et al., "Log Sequence Numbers," University of Wisconsin, May 2003.*

* cited by examiner

*Primary Examiner* — Tim T Vo
*Assistant Examiner* — Aaron Sanders
(74) *Attorney, Agent, or Firm* — DLA Piper LLP US (57) ABSTRACT

A database system providing high performance database versioning is described. In a database system employing a transaction log, a method for restoring databases to a consistent version including creating a cache view of a shared cache and performing undo or redo operations on the cache view only when a log sequence number falls within a certain range.

17 Claims, 5 Drawing Sheets

DATABASE SYSTEM PROVIDING HIGH PERFORMANCE DATABASE VERSIONING

CROSS-REFERENCE TO RELATED APPLICATIONS

This application is a continuation of U.S. patent application Ser. No. 10/710,356, filed Jul. 2, 2004, entitled "Database System Providing High Performance Database Versioning," now U.S. Pat. No. 7,822,727, which is hereby incorporated by reference in its entirety for all purposes. Included as part of that application (and incorporated by the present application) is a Computer Program Listing Appendix, which can be found at the U.S. Patent and Trademark Office archives, and is subject to copyright protection as described by that application.

BACKGROUND

1. Field of the Invention

The present invention relates generally to database systems, and, more particularly, to improved methodology for versioning of databases.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See, e.g., Date, C., "An Introduction to Database Systems, Eighth Edition", Addison Wesley, 2003. For a description of database transaction processing, see, e.g., Gray, J. et al., "Transaction Processing: Concepts and Techniques (Morgan Kaufmann Series in Data Management Systems)", Morgan Kaufmann, 1993.

In a database system, it is desirable to provide support for read-only transactions. If one only requires read access to a database for particular purposes, then one can conceivably create a system that achieves a transactionally consistent view of the database at a particular point in time, mainly when the transaction starts. This capability can be particularly valuable in a situation involving a lengthy duration read-only transaction, which is very common in the case of reporting, online back up, and the like. It can also be useful in a fail-over type situation as an efficient way to get a database back on line. Another example, for more sophisticated systems, is the case in which a replicate or minor copy of a database is being maintained. When a database is being mirrored, for scalability purposes it is desirable to be able to perform queries against one of these read-only minor copies. By doing so, this work can be off-loaded from the primary database to the mirror while also enabling data to be written. At the same time a query is being performed against this read-only mirror database, the read-only (mirror) database can also be updated with new records from the primary database without affecting the read-only transactions that are running against the minor database.

There are many types of database transactions that only require read access to the database. However, existing systems do not really take advantage of the fact that most transactions only involve reading from the database and consequently are unable to provide efficient concurrent access to the database. In order to provide greater scalability, it is desirable to be able to perform reads and writes concurrently. Write transactions should not be blocked from proceeding by read-only transactions that are being performed. At the same time, the write transactions should not block the read-only transactions.

In order to provide support for read-only transactions, one of the things that is needed is that the database system should not block for things like database locks, such as a table lock or row lock. However, in current database systems locks are almost always used for write transactions to achieve the goal of serializing the transaction, thereby serving as an obstacle to supporting read-only transactions in these systems. There are some current systems that have limited support for read-only transactions of this nature. Unfortunately, these current systems have a number of drawbacks and limitations. For example, at least one database system, the InterBase database system, uses a multi-generational architecture that avoids use of locks. However, the multi-generational approach has the disadvantage of the extra overhead required to maintain multiple database versions.

Generally, current systems supporting read-only transactions using one of two approaches. One of these approaches is the above multi-generation approach used in the InterBase database system. With this multi-generation approach, back versions of every change made to the database are actually recorded inside the database itself. This approach is not a log-based system as it does not use log files for versioning purposes. As a result, the database includes multiple versions of a given record and significant overhead is required to maintain a lot of duplicative information. Generally, the multi-generation approach causes the database to be populated with a lot of extra stores, back versions, and the like. This has an adverse impact on system performance.

Another issue with the multi-generation approach is that there is also a need for garbage collection in a manner similar to that needed in memory management. In the case of a multi-generation database system, there is the same need for garbage collection, however as it entails garbage collecting disk space, it can be quite expensive (computationally) and quite slow (e.g., compared to memory garbage collection). As a result, the approach can cause performance problems. For instance, a long duration read-only transaction may involve lots of write operations, thus generating lots of back versions, and so forth; these must be maintained and cannot be garbage collected until the read-only transaction commits. So in addition to the cost of garbage collection, there are also limitations on when it can be performed.

Another current approach is that illustrated by a current Oracle solution (available from Oracle of Redwood Shores, Calif.). The Oracle solution stores back versions in the database file itself. A disadvantage of this approach is that certain read-only transactions will sometimes fail because not all back versions are guaranteed to be maintained forever. Basically, the problem is that in some cases these back versions will overflow. When there are too many back versions, a certain number of back versions will be dropped. If a read-only transaction needs a particular back version and it has been dropped, then the read-only transaction will fail. Typically, the transaction will actually abort with an error message in the event of this type of failure. Given these shortcomings in current product offerings, a better solution is sought.

What is needed is a solution providing support for read-only transactions that does not have the foregoing disadvantages and limitations of prior systems. In particular, solution should maintain a read-only view of a database from a certain point in time even though other transactions are making changes to the same database. The solution should not require significant overhead and should not generate errors resulting from the dropping of back versions stored in the database. The present invention provides a solution for these and other needs.

DETAILED DESCRIPTION

Glossary

The following definitions are offered for purposes of illustration, not limitation, in order to assist with understanding the discussion that follows.

Action: A transaction is made up of one or more actions. Actions can be considered to be operations that leave the database in a structurally consistent view but not necessarily a transactionally consistent view.

Database block: The term "database block" refers to a page or data page. The JDataStore system in which the present invention is currently embodied uses a single file storage system. As a result, all tables, indexes, and database objects are stored in the same file, and that file is composed of blocks at the lowest level. A block can be thought of as a page that has a default size, which is 4096 bytes in the currently preferred embodiment.

ISAM: ISAM refers to the "Indexed Sequential Access Method" which is a disk storage and access method. In practice, the term ISAM is sometimes used to refer to desktop and/or file-based databases or IBM's Information Management System (IMS) and Btrieve databases. It is also used to refer to navigational database applications that rely on a procedural approach to data access and retrieval. Under ISAM, records are generally located using a key value. A smaller index file stores the keys along with pointers to the records in the larger data file. The index file is first searched for the key and then the associated pointer is used to locate the desired record.

JDBC: JDBC is an application-programming interface (API) that provides database access from the Java programming language. JDBC allows Java applications to access multiple database management systems. A set of interfaces is included in the standard JDBC API for opening connections to databases, executing SQL commands, and processing results. Each relational database management system usually requires a driver to implement these interfaces. A JDBC driver manager typically handles multiple drivers that connect to different databases. Accordingly, JDBC calls are generally sent to the JDBC driver manager, which passes the call to the driver for interacting with the specified database. For further information on JDBC, see e.g., "JDBC 3.0 API Documentation", from Sun Microsystems, the disclosure of which is hereby incorporated by reference. A copy of this documentation is available via the Internet (e.g., currently at java.sun-.com/products/jdbc/download.html#corespec30).

LSN: A "log sequence number" or "LSN" is a central data member used internally by the system. In the presently preferred embodiment, log sequence numbers are 64 bit addresses into any given transactional log file. The first part (i.e., high 32 bits) of the LSN is a file ID. The first log file created is usually log 0, the next one is log 1, and so on and so forth. These log files are then chained together. The second part (i.e., low 32 bits) of the LSN is the address—that is, the offset within that log file. This is the address in the log file of the last change that was made to a database block.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. A feature of a relational database is that users may define relationships between the tables in order to link data that is contained in multiple tables. The standard user and application program interface to a relational database is the Structured Query Language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5)-1999), the disclosure of which is hereby incorporated by reference.

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., currently at www.ietf.org/rfc/rfc1180.txt).

Transaction: A transaction comprises a set of database operations which must be executed either in its entirety or not at all. A transaction is also sometimes referred to as a logical unit of work (LUW). Transactions maintain data integrity and ensure that the database remains in a consistent state. Transactions end with either a commit or rollback statement. If a transaction ends with a commit statement, all the changes made to the database are made permanent. If the transaction fails, or ends with a rollback, none of the statements takes effect. A transaction is sometimes called atomic since it is performed as a unit.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

Figure 1:
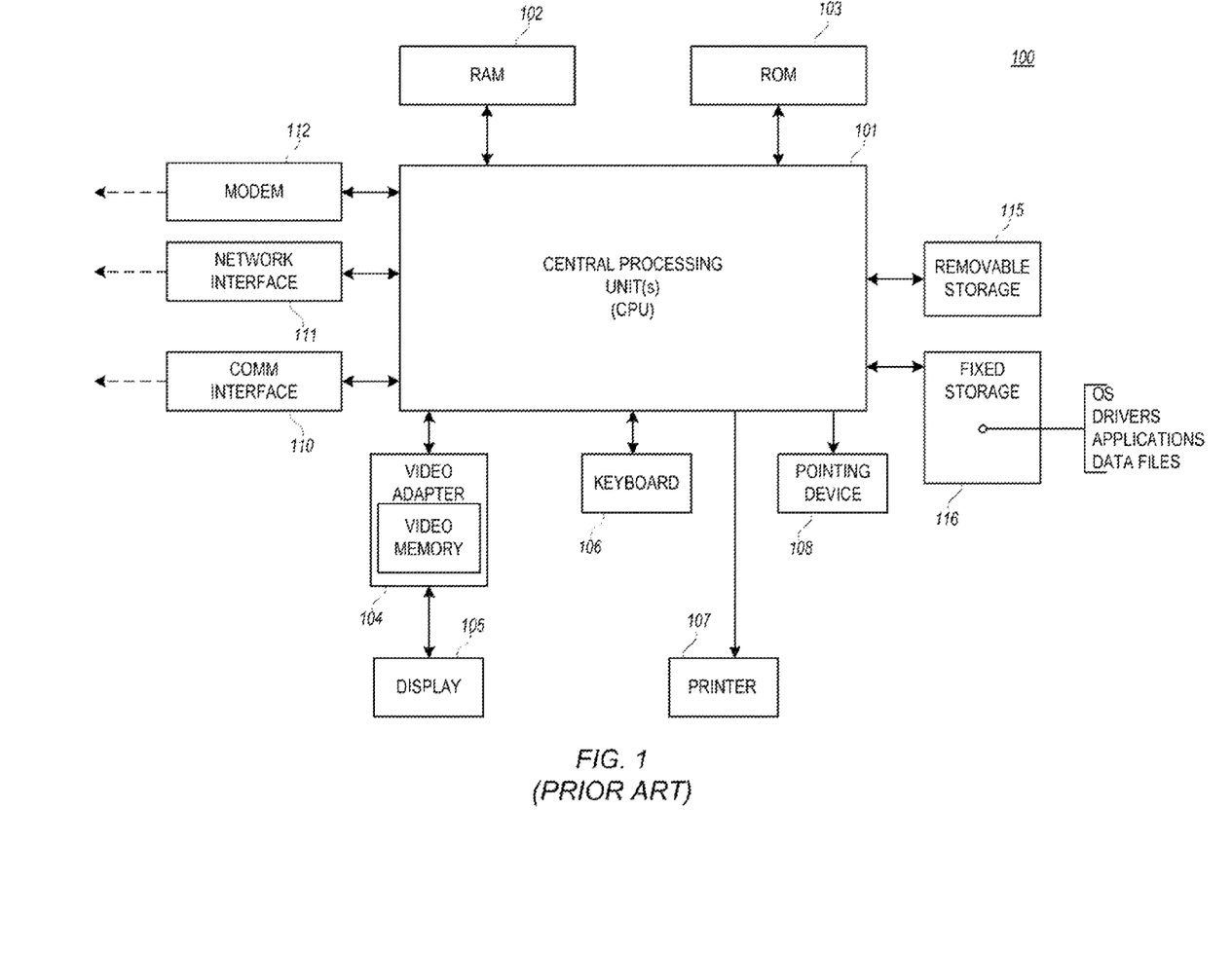
FIG. 1 is a very general diagram of a computer system (e.g., an IBM-compatible system) in which software-implemented processes of the present invention may be embodied.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like.

Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
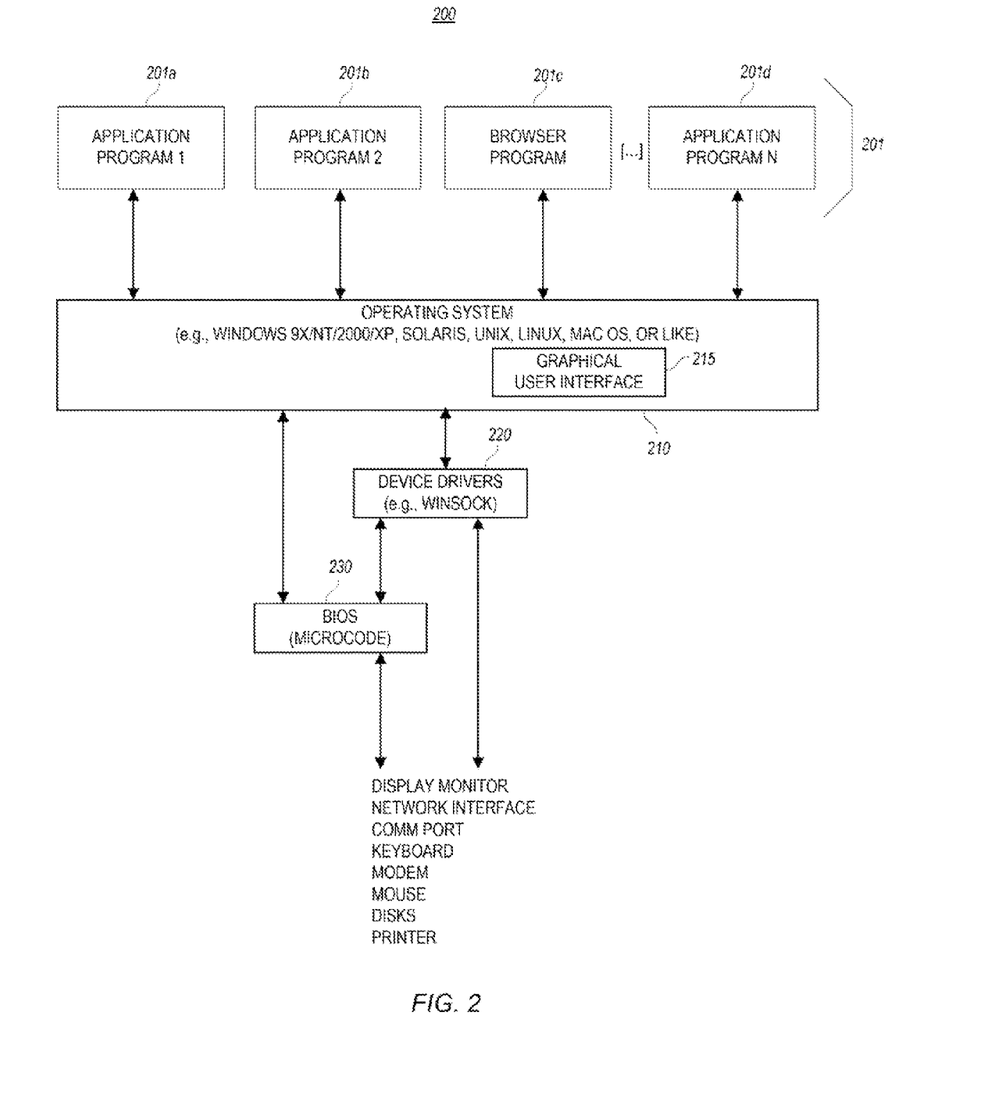
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists at least one "server" (e.g., database server) that communicates with one or more "clients" (e.g., desktop computers running database applications). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of High Performance Database Versioning

At a high level, the basic approach of the present invention is to provide a shared cache per process across all databases that are opened. For memory management purposes it is efficient to share the same cache, with the databases competing for cache blocks with each other. By default each database has a cache view. Thus, each view is associated with a cache "owner".

With read-only transactions the methodology of the present invention provides for introducing another cache view. This new cache view is for the same database as the write cache view but it is a separate view of the database. In general terms, it is a view of a version of a database at a particular point in time. The approach of the present invention involves using the cache in order to create a view of the database at a particular point in time. Since details regarding all changes to the database are recorded in the transaction log file(s), the transactional log file(s) may be used to reconstruct a view of the database at this particular point in time. The view is constructed by applying log records to this view in the cache, so as to create a version of the database at a particular point in time.

Another important aspect of this approach is that for the duration of a given read-only transaction, once this view is created by modifying cache blocks for the database, these blocks cannot be written back to the primary database (because the write would corrupt them as it is a different view from a different version of the database). However, for implementing the present invention it is desirable that these blocks are not lost. Accordingly, the present invention utilizes a "shadow" cache, which itself is implemented via a temporary database table. If the cache is overflowing then the shadow cache may be employed to hold the blocks from this old version that have been created (e.g., for use in a read-only transaction).

In the currently preferred embodiment, the shadow cache is implemented by taking advantage of a temporary database that is used in conjunction with a SQL query engine to create a simple shadow table. The shadow table that is created is a very simple shadow table which contains a mapping of the block from the read-only cache view into a block that is to be used as a backing store in the shadow table. The shadow table is a very narrow table and it can be accessed very efficiently. In the presently preferred embodiment of the present invention the shadow table is keyed on block number and it also records a secondary block, which is the block that it maps to a block allocated in the temporary database.

It is important to note that this shadow cache is only used if needed. If the cache view itself does not live long enough to ever need to write any of its blocks to the shadow cache, then those cache blocks will not be written to the shadow cache and instead will just be invalidated. As a result the shadow cache is very efficient. Unless a transaction has to modify a lot of blocks or lasts a very long time, the shadow cache will likely not be used.

The shadow cache is used to preserve logical undo. When a read-only transaction is started, one of the phases that needs to be performed is logical undo. Thus, the cache blocks cannot simply be discarded. Generally, the logical undo can only be done once. The logical undo operation is done at the beginning of the read-only transaction. Any of the effects of that logical undo operation need to be preserved for the lifetime of that transaction. The shadow cache enables the effects of the logical undo to be saved, which in the currently preferred embodiment allows the logical undo operation to be preserved up front. A side benefit of the shadow cache is that it also enhances performance.

System Components

Figure 3:
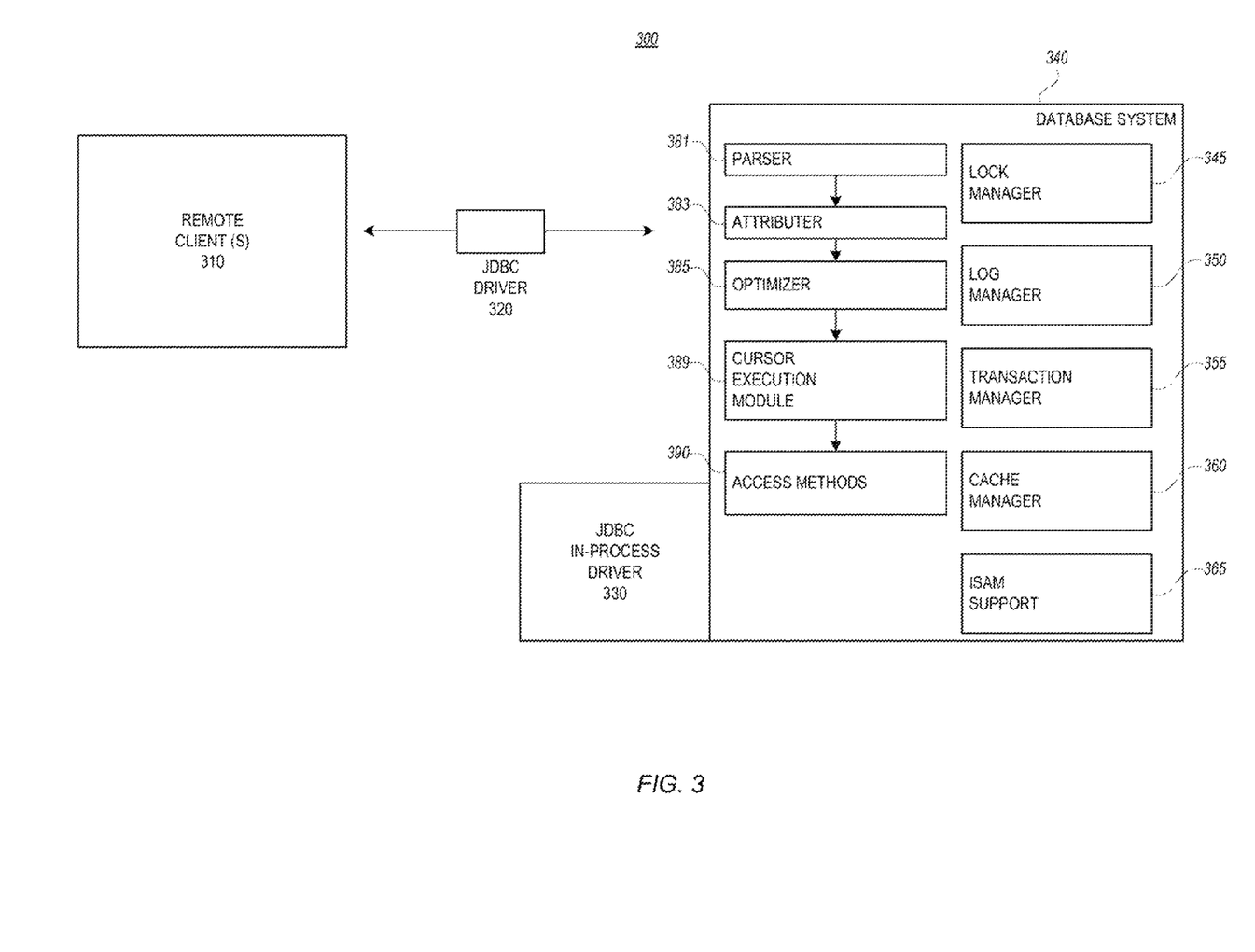
FIG. 3 is a high-level block diagram illustrating a database system suitable for implementing the present invention.

FIG. 3 is a high-level block diagram illustrating a database system suitable for implementing the present invention. As shown, environment 300 includes remote client(s) 310 (e.g., personal computers, handheld devices, or the like) connected to a database system 340 via a JDBC driver 320. In the currently preferred embodiment, the database system 340 comprises the Borland® JDataStore™ database system. JDataStore is a high-performance, cross-platform relational database system available from assignee Borland Software Corporation of Scotts Valley, Calif. The database system 340 is modified to include new modules that implement the methodology of the present invention. Although the methodology of the present invention is currently embodied in the JDataStore database system, those skilled in the art will appreciate that the methodology of the present invention may also be implemented in other relational database systems (e.g., Oracle, Microsoft SQL Server, and IBM DB2).

As shown at FIG. 3, the database system 340 includes conventional database components, such as a query parser 381, a attributer 383, an optimizer 385, and access methods 390. The architecture also includes a cursor execution module 389. As also shown in the figure, the database system 340 includes supporting subsystems (performing their respective named functions): a lock manager 345, a log manager 350, a transaction manager 355, a cache manager 360, and ISAM (support) module 365.

In basic system operation, clients typically connect to the database system (i.e., JDataStore) using JDBC drivers. The system includes support for two different types of JDBC drivers. As shown, a remote client 310 may connect via a remote JDBC driver (e.g., driver 320) which communicates over a network using TCP/IP. The system also includes an in-process JDBC driver 330 which calls directly on the same call stack in order to provide increased efficiency. The same API is used for both drivers; however the in-process JDBC driver calls on the same call stack while the remote JDBC driver marshals over TCP/IP. For further description of the basic operation/design of JDataStore, see "JDataStore 7 Developer's Guide" (Part No. JBE0090WW21004), available from Borland Software Corporation of Scott's Valley, Calif., the disclosure of which is hereby incorporated by reference. A copy of this document is also available via the Internet (e.g., currently at ftpc.borland.com/pub/jdatastore/techpubs/jdatastore7/jds_devgd.zip).

When a query is received by the database system (e.g., from remote client 310), the query parser 381 begins the processing of the query by parsing the query. The query parser 381 breaks the query up into individual tokens, makes sure that the query statement is valid, and so forth. Syntax errors and misspellings in the query may also be detected by the parser 381 during this process. After the query is parsed into tokens by the query parser, the attributer 383 performs error checking, such as confirming that table names and column names which appear in the query are valid (e.g., are available and belong together). The attributer 383 may also eliminate redundancies in the query expression.

The optimizer 385 determines the most efficient way of producing the result of the query after considering many factors including the tables referenced and the conditions specified in the query. The optimizer 385 performs an important role in the processing of SQL queries and can greatly affect query execution time. The optimizer 385 may, for instance, select relevant indexes (when available) and other access methods to be used during the execution of the query. The output from the optimizer 385 is a plan that describes an optimum method of execution of the query. The plan generated by the optimizer is then used to invoke the access methods 390 for obtaining data requested by the query.

The access methods 390 typically operate within the context of a cursor, with the system supporting various kinds of cursors (e.g., join cursors, index look-up cursors, and so forth). Execution of a query is generally done in steps, because a query can be broken up into multiple steps. The execution of these steps is usually wrapped in what is referred to as a "cursor". A cursor execution module uses the access methods 390 in order to access data in response to a query. The database system generally includes a number of different kinds of access methods as there are a number of different ways of solving a query provided as part of SQL.

The database system 340 also includes support for low-level access to the database (e.g., similar to ISAM level support). ISAM refers to the "Indexed Sequential Access Method" which is a disk storage and access method. It also is used to refer to navigational database applications that rely on a procedural approach to data access and retrieval. Under ISAM, records are generally located using a key value. A smaller index file stores the keys along with pointers to the records in the larger data file. The index file is first searched for the key and then the associated pointer is used to locate the desired record.

The lock manager 345, log manager 350, transaction manager 355, and cache manager 360 are supporting subsystems of the database system 340. The lock manager 345 uses database locks to provide concurrency control. Locks are typically acquired at a row or table level. In the presently preferred embodiment, the locks used by the JDataStore lock manager 345 include both shared and exclusive row locks and shared and exclusive table locks.

The log manager 350 maintains and manages one or more logs (e.g., in safe storage on disk). A log is a file that is typically organized sequentially for recording events (e.g., transaction events). The transaction manager 355 creates transaction objects and manages their atomicity and durability. The transaction manager typically records transaction starts as well as commit and rollback decisions in the log. During normal processing, the transaction manager writes to the log. However, the log can also be read to reconstruct the most recent state of the database and make this state durable.

The cache manager 360 is responsible for managing the cache. Cache is a type of memory that contains recently accessed data, designed to speed up subsequent access to the same data. The cache is often used to hold a local copy of frequently-used pages of data from the database. By having data pages stored in the cache, the database may avoid having to read in information from disk. Importantly, the methodology of the present invention is implemented in the cache manager 360, the transaction manager 355, and the log manager 350 components of the database system, as will next be described.

Detailed Operation of Database Versioning Methodology

Introduction

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Before describing the methodology of the present invention in further detail, it is helpful to first review some general concepts regarding transaction management and crash recovery. The terms used in the following discussion regarding the system of the present invention and its support for transaction management and crash recovery are based on information contained in the previously mentioned Gray et al. book titled "Transaction Processing." The terms that are defined in that book that are relevant to the following discussion of the present invention include lock sequence numbers (LSN), physical redo, physical undo, logical undo, actions (as opposed to transactions), and compensation records. Some of the terms and concepts will be briefly summarized below for use in the discussion that follows.

A "log sequence number" (LSN) is a central data member used internally by the system. In the presently preferred embodiment, all but three of the database blocks have an LSN field. The three blocks that do not have a LSN are used for database header and anchor information used at database startup. Log sequence numbers are 64 bit addresses into any given transactional log file. The first part (i.e., high 32 bits) of the LSN is a file ID. JDataStore uses multiple log files and these log files have a maximum length. The default maximum length is 64 MB. The first log file created is usually log 0, the next one is log 1, and so on and so forth. These log files are then chained together. One advantage of maintaining multiple log files is that when the log records are no longer needed for crash recovery or for a current transaction, they can simply be dropped. For the lifetime of a given database these file IDs are never reused; they are always increasing in value.

The second part (i.e., low 32 bits) of the log sequence number is the address—that is, the offset within that log file. All database blocks (except for the three previously noted) have a log sequence marker. This is the address in the log file of the last change that was ever made to that database block. In operation, before a database block is written to disk, all changes to a database file are redundantly written to the log file. Generally, a database block cannot actually be written to the database file until the log records for every change made to that block are written to disk in the log file. Therefore, when the log records are written to disk during that process, the database block itself gets stamped with that log sequence number for the most recent change to that block. Basically this is a stamp in-time for this version which provides version information regarding the database block.

A "database block" as used herein is equivalent to a page or data page (i.e., the terms are interchangeable). The JDataStore system in which the present invention is currently embodied uses a single file storage system. As a result, all tables, indexes, and database objects are stored in the same file, and that file is composed of blocks at the lowest level. A block can be thought of as a page or a block that has a default size which is 4096 bytes in the currently preferred embodiment.

Another important concept to understand is the concept of physical redo and physical undo, and the difference between physical operations (i.e., redo or undo) and logical undo operations. One key differentiator is that one can apply physical operations, either redo or undo, on a per block basis. When going through the log records, if one wants to bring a block to a particular point in time relative to the log file, records can be redone if its log sequence is old, or can be undone if it is newer. For a physical undo/redo, this can be done in isolation for one block (i.e., on a per block basis). However, logical operations are high-level operations, so a logical action may impact more than one block.

A logical "action" should be distinguished from a transaction. A transaction is made up of one or more actions. Actions can be considered to be operations that leave the database in a structurally consistent view but not necessarily a transactionally consistent view. This may be illustrated by an example of inserting a key into a B-Tree. When that operation is complete it may actually have affected more than one block (i.e., more than one node of the tree). It leaves the database in a structurally consistent view, or action consistent view. However, it is not necessarily a state that is desirable. What is needed is a view that is transactionally consistent, not one that is merely action consistent, because an action consistent view may be logically corrupt. In any event, a key difference between logical undo and physical undo/redo is that logical undo must be done at a higher level as discussed below in more detail.

Cache View

As previously discussed, for a particular process that the database kernel is operating in there is one static cache for all database files open in the same process. Each database file has its own cache view, so the cache knows that this is a view or "owner" of these cache blocks. All of the cache blocks for a particular database will generally have the same view or owner. Read-only transactions leverage this technique to create yet another cache view for the same database. However, it is a separate view of the database that is going to be made transactionally consistent relative to a particular point in time.

Read-only transactions have a property called the read-only transaction delay setting. This setting enables one to specify, for example, a 30 second delay and if five read-only transactions are all started within the same period (e.g., the same 30 second period) they can share the same cache view. As a result, five different read-only cache views are not required for the five transactions. This setting can be user configured. For instance, if a user does not care if a transaction is out of date by ten minutes then it can be set for ten minutes. In this case, every transaction that starts within that same ten-minute bracket will share the same cache view. This is an optimization that has been incorporated into JDataStore.

Row-Level Locking

The read-only transactions supported by the present invention also support use of row-level locking. If row-level locking is not supported, physical undo and redo can be used to create a transactionally consistent view of the database because write operations from two or more transactions cannot be interleaved. Write access to a table is effectively serialized for all transactions. Once a transaction performs a write operation on a particular table, no other transaction will be able to write to this table until the first write transaction commits. Thus, physical redo and undo could be used to provide consistency in this instance. However, when row-level locking is used to create more concurrency, there could be multiple transactions having write operations to the same block in a table. That is problematic because in that case physical undo and redo operations alone cannot be relied upon to provide complete transaction consistency. When multiple write transactions have interleaved write operations to the same tables, physical undo and redo operations are applied as blocks are loaded into the cache, but higher level logical undo operations may then need to be applied to make the cache view transactionally consistent.

Without row-level locking support, one could always load blocks in on demand and fix them up relative to the read-only transaction by applying physical redo and undo on demand on a per block basis. However, with row-level locking this can no longer be supported. A work-around for this problem is to create a state where new transactions could not be started temporarily until all the old transactions had committed to create a transaction clean point. Once a transaction clean point was obtained, then one could actually use physical redo and undo. However, a drawback of this approach is that it stops the creation of new transactions because an existing transaction, if it was of long duration, could take a long time to commit and it would block all new transactions until it terminates. As a result this work-around is primarily suitable for cases involving a lot of short duration write transactions, but is problematic in the case of a long duration write transaction.

The present invention avoids the need for transactional clean point by introducing a way of performing logical undo. The logical undo is performed at the start of the read-only transaction. Performing the logical undo will cause the system to modify blocks and it will need to hold on to these modified blocks until the read-only transaction commits. Normally, if there are not too many of these modified blocks they can be fit into the cache. But there may be a situation where the cache runs out of cache blocks and it needs to spill them over (i.e., there is an overflow). The shadow cache is designed to address this overflow problem. The processing that occurs when a read-only transaction starts will next be described.

Processing When The Read Only Transaction Starts

Figure 4A:
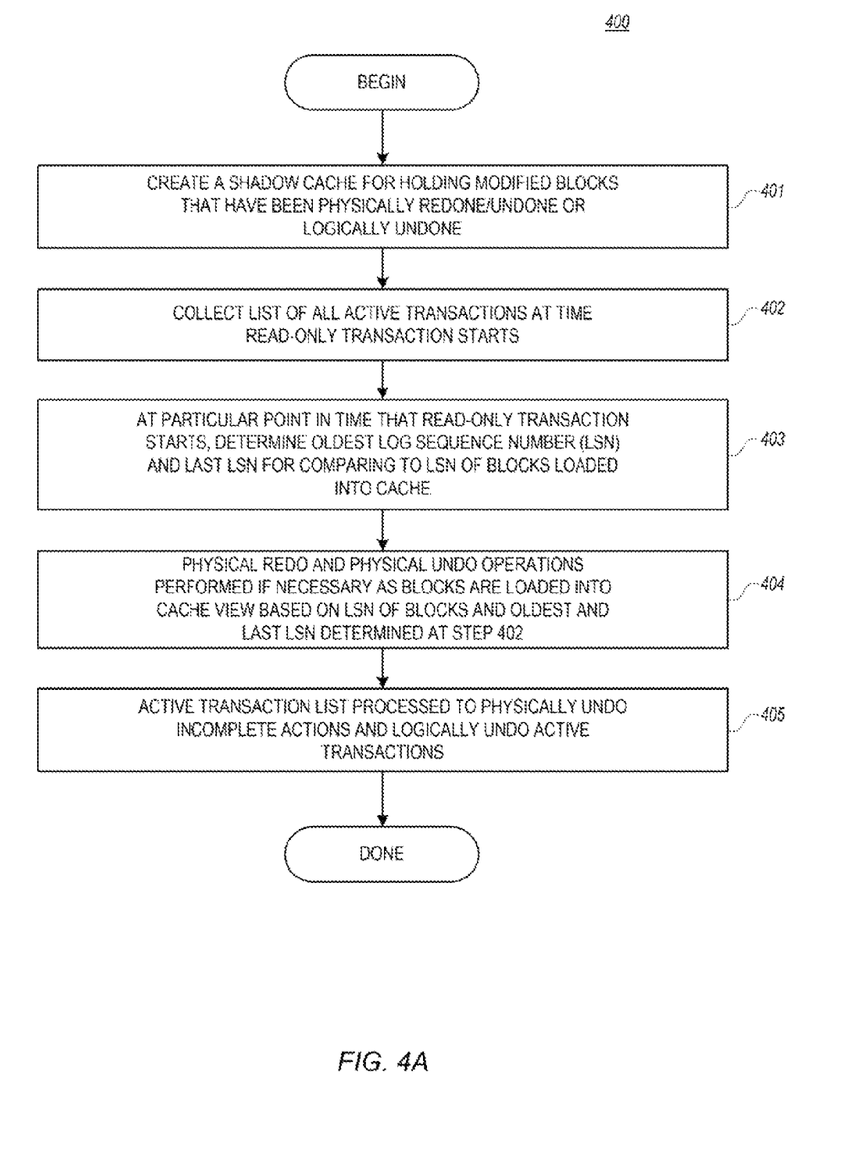
FIG. 4A is a flowchart illustrating the operations of the system of the present invention when a read-only transaction starts.

FIG. 4A is a flowchart 400 illustrating the operations of the system of the present invention when a read-only transaction starts. At step 401, a shadow cache for holding modified blocks that have been physically redone/undone or logically undone is created. In the currently preferred embodiment the shadow cache is created in the temporary database. The temporary database is a separate database file that is also used for SQL query result sets. Currently, the shadow cache uses a database shadow table of two columns as described below. Note that the shadow cache is only used if the cache needs to discard a read-only transaction cache view block that had redo/undo records applied. The shadow cache is only used if needed. If there are not too many of these modified blocks they normally can be fit into the cache. However, if the cache runs out of cache blocks, they overflow into the shadow cache.

The shadow cache comprises a shadow table which is a very narrow table. Currently the shadow table has two columns; it is just a mapping of blocks from the read-only cache view to the backing store in the temporary database. The shadow cache uses a database shadow table of two columns: a) block number of cached view block that has had undo/redo records applied to it; and b) block number of block in a temporary database allocated to save off the modified block from the read-only cache view. The temporary database block is allocated inside the temporary database file using the same block allocation mechanism used to allocate storage for database tables, indexes blobs, and the like. It is very fast to delete these blocks if needed because the database file system uses a localized bitmap to mark blocks deleted or allocated. After setting up the shadow cache, some additional computations are made as described below.

At step 402, a list of all the active transactions at the time the read-only transaction starts is also collected. This list contains enough information to undo all the changes made by each transaction. This information includes the first and last log record written for each transaction. This is basically the information that is used to do a rollback when necessary. At step 403, two important log file addresses are determined at the particular point in time that the read-only transaction starts: the oldest log sequence number (oldest LSN) and the last log sequence number (last LSN). The oldest LSN is the LSN for the oldest active write transaction. For all the transactions that are currently running at the point in time the read-only transaction starts, the oldest one is found. The last LSN is the current position in the log file, which is the LSN of the most recently written log record.

At step 404, as blocks are read for this read-only cache view, physical redo and physical undo operations are performed if necessary based on the LSN of the blocks loaded into the cache view and the oldest LSN and last LSN determined above at step 402. A block is loaded into a read only-cache view either from disk or from another write or read-only cache view for the same database. When a block is loaded, its LSN is compared to the oldest LSN and last LSN to decide what physical redo or undo operations may need to be performed as described below. Any necessary operations are then performed as hereinafter described.

At step 405, the active transaction list is now processed to physically undo incomplete actions and logically undo the active transactions. Physically undoing incomplete actions makes the read-only cache view "action consistent" or completely physically consistent. However, this does not yet ensure logical or transactional consistency, which may still require the performance of some additional physical undo operations. However, logical undo operations cannot be applied until after the read-only cache view is action consistent. At this point, the logical sequence number of blocks that have been brought in has been examined and adjustments made to get to a certain level of physical consistency.

Processing the active transaction list to logically undo the active transactions provides transactional consistency. This is basically like providing rollbacks on all the active transactions (as they may include partial action). This process completes the transactional rollback of all active transactions for the read-only cache view. As a result, a few blocks (or a number of blocks) may have been modified to achieve this transactional consistency. All of these "dirty" blocks in the read-only cache view cannot go to the original database. Thus, if there is an overflow situation these blocks must go to the shadow cache. But again, they only go to the shadow cache if there is an overflow situation. For many read-only transactions that are short lived and/or do not modify enough blocks to overflow the cache, the shadow cache is not used.

Physical Undo and Redo Operations at Start of Read-Only Transaction

Figure 4B:
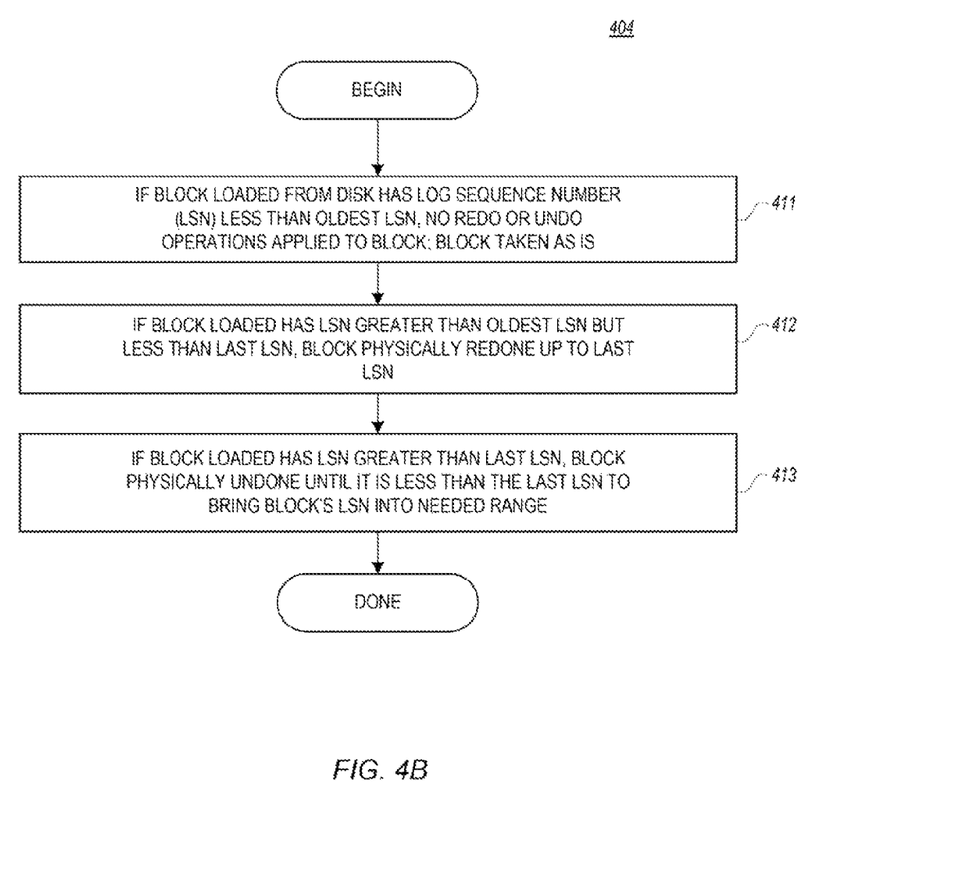
FIG. 4B is a flowchart (corresponding to step 404 of FIG. 4A) illustrating the processing of blocks loaded into the read-only cache view for performing undo and redo operations at the start of a read-only transaction in further detail.

FIG. 4B is a flowchart 404 (corresponding to step 404 of FIG. 4A) illustrating the processing of blocks loaded into the read-only cache view for performing undo and redo operations at the start of a read-only transaction in further detail. The following discussion describes what operations are performed on each block loaded into the read-only cache view based on comparing the block's log sequence number to the oldest log sequence number and the last log sequence number determined above (i.e., the oldest LSN and last LSN determined at step 402 at FIG. 4A).

At step 411, when a block loaded from disk has a log sequence number that is less than the oldest log sequence number, then no redo or undo operations need to be applied to the block. The block can just be taken as is because there are no changes to the block that are of concern.

At step 412, if the block that is loaded has a log sequence number greater than the oldest log sequence number but less than the last log sequence number, the block must be physically redone up to the last log sequence number. This makes sure these blocks are good up to the most recent change. They are not usable at that level yet, but this gets them close to that state. At this point, the methodology of the present invention is concerned with getting the blocks to a good physical state. They are not guaranteed to be in a good logical state yet. But as this is at a low level, as blocks are being brought into the cache, these operations serve to guarantee that as they are loaded into the cache they are guaranteed to be in a good physical state.

At step 413, if the block that is loaded has a log sequence number greater than the last log sequence number, the block must be physically undone until it is less than the last log sequence number. Some blocks may have had write operations that happened after the read-only transaction started. These operations have to be physically undone until they are less than the oldest log sequence number. In other words, the block's log sequence number is brought into the needed range.

After the Read-Only Transaction Starts

After the read-only transaction starts, some loaded blocks may still have physical undo records applied to them when they are loaded. These are changes from write transactions that started after the read-only transaction started. However, no blocks loaded should ever need to be physically redone or logically undone after the start phase as these steps have been performed. In other words, logical undo is only done at the start and does not need to be done again at a later point as the modified blocks are maintained. Once the upfront logical undo (or rollback) have been completed, the cache view is in a transactionally consistent state. If any more blocks need to be read, the only operation that may need to be performed is a physical undo operation, if anything. In other words, only write operations made after the last LSN need to be physically undone.

To prevent the need for physical redo or logical undo after the start process, the blocks modified for the read-only transaction must always be available. This is part of the reason the shadow cache was created. If many blocks were modified, they may overflow the in-memory cache. The shadow cache provides a backing store for these overflow situations. The shadow cache can also improve performance since modified read-only cache view blocks may have required the processing of many transaction log records from the redo/undo operations applied to them.

Back Links

The present invention also includes a "back link" optimization, which may be important after the initial start phase of the read-only transaction. What may be encountered is a situation in which many write operations may be performed to the database and to a particular block. For example, a particular block X may be modified, and then thousands of log records may be generated and then modified again. So to physically undo this it would be more efficient to be able to skip all those records in between. The system automatically detects an active read-only transaction. As a result, as write operations are made it starts adding special log records only for the purpose of read-only transactions that back link these blocks. Thus, if operations to physically undo one of these blocks is needed, it back links to the next change to that block so it can skip portions of the log file that are not relevant. This avoids having to go sequentially backwards through the whole log file for physical undo. As an optimization, these back link log records are only added when there are active read only transactions. This is because these back link records are only used by read only transactions.

Termination of Read-Only Transaction

The final phase in a read-only transaction is terminating the read-only transaction. An advantage of the present invention is that the termination of read-only transactions is very fast and does not carry all the baggage of existing systems because it never writes anything to the database file itself. The present invention does write, potentially, some things to a temporary database file for shadow caching, but those are also very efficient to delete and do not require performing a formal garbage collection.

Initially, it should be noted that as the read-only transaction terminates, a very fast operation marks the read-only cache view as closed. It is not required to notify the cache of this termination, it is just marked as a state. As the cache traverses and looks for blocks to purge it will notice that this cache view is closed and know that it can reuse that block immediately. It does not have to save the block, which increases efficiency. It is almost like an instantaneous drop of these blocks.

In many cases these blocks never need to go to the shadow cache. If this is the case, then it is extremely efficient to terminate. Even if blocks did have to go to the shadow cache, the termination is still quite fast, comparable to deleting an operating system file. Even if there was a very large shadow cache for a lot of write operations that needed to be saved off to the shadow cache, the system of the present invention is able to drop them very fast. The reason for this is that the shadow cache file table itself for each block has very little overhead. In the currently preferred embodiment there are only two integers stored for each block and they are all stored sequentially. Accordingly, one can simply go through and delete each one of these from the temporary database. A delete operation is very fast because it is typically just updating an allocation bit map. It is not necessary to actually traverse to the deleted block (i.e., to visit the deleted block itself). Instead, the system goes to the allocation bit map block and marks a bit. Typically since these bit maps can store allocation information for a large number of blocks (e.g., megabytes and megabytes of blocks), a lot of the same block allocations are in the same allocation bit map block. As a result, the system often modifies the same allocation bitmap block over and over, which enables deletes to be performed very efficiently.

Clean-Up/Deletion of Shadow Cache

Then the last item to delete is the shadow table itself. Recall that the shadow table is very compact because there are only two columns in the shadow table. As a result the shadow table typically requires no more than 8 bytes for each block stored, and they are all sequential. Also, dropping tables in JDataStore for similar reasons is very fast. Thus, even if the shadow cache did get larger it would still be deleted very, very quickly. The present invention does not require any complex garbage collection process, so this process can proceed much faster than prior solutions with complex garbage collection routines.

Advantages

The system and methodology of the present invention provides several advantages compared to prior art database versioning systems. One advantage is that the present invention does not include back versions in the database. In other systems, including back versions causes the primary database to get bigger, sometimes overflowing the cache. The present invention provides for only paying a price for the read-only transactions if they are used In contrast, prior solutions that persist their state inside the database itself make the database bigger which affects read operations because now it could be loading things. Typically database systems load data in terms of pages or cache blocks. These prior solutions may load items that are never used for a read/write transaction. Also, these solutions require algorithms for purging (aging) the back versions. These may include garbage collection schemes which can be very expensive in terms of system performance. Particularly if there are a lot of read/write transactions, all these versions in the database can have an adverse impact on performance.

Another advantage of the present invention is that in the event of a crash all the version information in JDataStore does not have to be recovered because the temporary database is non-transactional. For performance reasons, it is assumed that the temporary database does not have to survive a crash. If the system does crash, the temporary database is just deleted at the file system level. Still another advantage is that the database only incurs costs if read-only transactions are used. As noted above, the system incurs cost for read-only transactions only when they are being used because versioning storage does not persist after the read-only transaction is completed.

The methodology of the present invention can be compared to log-based crash recovery as both use some similar concepts. However, the present invention uses these concepts in a different way and with different caveats. For example, physical redo, physical undo, and logical undo are all concepts that exist in log-based transaction management systems. A number of databases use log-based transaction management systems; in fact it is currently the dominant way of providing transaction support in crash recovery of commercial database products.

Unlike crash recovery, however, the present invention performs physical redo and physical undo on a demand basis as blocks are loaded into the read-only cache view. In crash recovery the first phase of crash recovery for a log-based system is to go through all the redo records that are needed for crash recovery and apply them to the database in a batch fashion. The crash recovery process then involves physically undoing all the incomplete actions in batch fashion. In contrast, the present invention performs these actions on demand as needed. Also, after the read-only transactions start, the present invention uses physical undo in a different way—it uses this technique to undo write operations that occur after the read-only transaction started.

Another difference is that unlike crash recovery, the present invention does not generate "compensation records" for physical undo or logical undo operation. The main purpose of compensation records, as defined in the above-referenced "Transaction Processing" book, is that when a crash recovery operation is being performed, one is actually writing to the database. It is in effect a transaction itself, so compensation records are generated for the (rare) situation in which a system crash occurs while the crash recovery is being performed. These compensation records are not needed for read-only transactions because read-only transactions do not need to survive a crash. The approach of the present invention increases efficiency by avoiding having to write numerous log records that are not really needed.

The present invention also provides that write operations to the database blocks for a read-only transaction view are kept in the database memory cache if possible. These blocks never go to the database file itself. If the memory cache overflows the modified read-only transaction blocks are written to the shadow cache, not to the database. In fact, it would likely cause database corruption to actually write them to the database. In contrast, blocks modified by crash recovery must be written to the database file itself.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method, comprising:
collecting an active transaction list of all active transactions when a read-only transaction starts, the active transaction list including a first log record and a last log record associated with each active transaction;
determining an oldest log sequence number and a last log sequence number associated with the active transaction list;
loading a modified block into a cache view, the modified block including a log sequence number;
comparing the log sequence number to both the oldest log sequence number and the last log sequence number; and
performing physical redo operations or physical undo operations based upon the comparing, wherein the physical redo operations or the physical undo operations are not performed on the modified block when the log sequence number is less than the oldest log sequence number, and the physical redo operations are performed on the modified block when the log sequence number is greater than the oldest log sequence number and less than the last log sequence number, and the physical undo operations are performed on the modified block when the log sequence number is greater than the last log sequence number.

2. The method of claim 1, further comprising using an allocation bitmap configured to indicate the modified block is to be temporarily stored in a temporary database.

3. The method of claim 1, further comprising marking the cache view as closed upon termination of the read-only transaction.

4. The method of claim 1, further comprising sharing the cache view with other read-only transactions which start within a period of time following a start of the read-only transaction.

5. The method of claim 1, further comprising:
detecting the read-only transaction; and
adding a back link log record to a transaction log, the back link log record being configured to link to another log record in the transaction log that is associated with a write transaction, the adding being performed upon occurrence of a write operation.

6. The method of claim 5, further comprising using the back link log record to skip a portion of the transaction log that is irrelevant to undoing an uncommitted write transaction, wherein the back link log record is generated in the transaction log when there is an active read only transaction, if the read-only transaction must be undone.

7. A computer-readable storage medium having processor-executable instructions for performing the method of claim 1.

8. The method of claim 1, further comprising:
downloading a set of processor-executable instructions for performing the method of claim 1; and
storing the set of processor-executable instructions on a computer-readable storage medium configured to be accessed by at least one computer.

9. A database system configured to restore a database to a consistent version supporting read-only uses, comprising:
- a computer having a processor and memory;
- a log manager module configured to manage a transaction log of the database system;
- a cache manager module configured to manage a shared cache that stores one or more database blocks in a memory of the database system, and configured to create a write view of the database in the shared cache supporting read and write uses of the database and a cache view of the database using the transaction log of the database, the cache view being created in response to a read-only transaction of the database, the cache view comprising the one or more database blocks of the shared cache that record a view of a version of the database at a time, wherein the steps to create the cache view include
  - collecting an active transaction list of all active transactions when a read-only transaction starts, the active transaction list including a first log record and a last log record associated with each active transaction;
  - determining an oldest log sequence number and a last log sequence number associated with the active transaction list;
  - loading a modified block into a cache view, the modified block including a log sequence number;
  - comparing the log sequence number to both the oldest log sequence number and the last log sequence number; and
  - performing physical redo operations or physical undo operations based upon the comparing, wherein the physical redo operations or the physical undo operations are not performed on the modified block when the log sequence number is less than the oldest log sequence number, and the physical redo operations are performed on the modified block when the log sequence number is greater than the oldest log sequence number and less than the last log sequence number, and the physical undo operations are performed on the modified block when the log sequence number is greater than the last log sequence number; and
- a transaction manager module configured to logically undo one or more transactions on demand, the one or more transactions having begun but having yet to commit upon starting the read-only transaction in order to construct the cache view comprising a transactionally consistent prior version of the database, performing the read-only transaction using the cache view without blocking performance of the one or more transactions involving a write operation using a write view of the database, and returning a result associated with the read-only transaction.

10. The system of claim 9, wherein a database block associated with the cache view is not written from the shared cache to the given database during occurrence of the read-only transaction.

11. The system of claim 9, wherein the cache manager maintains an allocation bitmap identifying the one or more database blocks being temporarily stored in a temporary database.

12. The system of claim 11, wherein the cache manager is configured to delete the one or more blocks from the temporary database by updating the allocation bitmap.

13. The system of claim 9, wherein the cache manager is configured to mark the cache view as closed upon termination of the read-only transaction.

14. The system of claim 13, wherein the cache manager is configured to traverse the shared cache looking for the one or more blocks to purge, and is further configured to purge the one or more blocks from the cache view if the one or more blocks from the cache view have been marked as closed when a new block allocation is requested in the shared cache.

15. The system of claim 9, wherein the cache manager is configured to share the cache view created for the read-only transaction with other read-only transactions that are configured to start within a period of time following a start of the read-only transaction.

16. The system of claim 9, wherein the log manager is configured to detect the read-only transaction, and further configured to add a back link log record to the transaction log that is configured to link together two or more log records of the transaction log that are associated with a write transaction to be logically undone.

17. The system of claim 9, wherein the log manager is configured to use a back link logrecord to skip a portion of the transaction log that is not associated with undoing the write operation, wherein the back link log record is generated in the transaction log when there is an active read only transaction.

* * * * *